United States Patent Office 3,531,415
Patented Sept. 29, 1970

3,531,415
LIQUID FORMS OF CHLORENDIC ACID BASED ESTER POLYOLS
Harold E. Reymore, Jr., Wallingford, and Adnan A. R. Sayigh, North Haven, Conn., assignors to The Upjohn Company, Kalamazoo, Mich., a corporation of Delaware
No Drawing. Filed Dec. 11, 1967, Ser. No. 689,318
Int. Cl. C09c 69/62; C08g 22/24; C09k 3/00
U.S. Cl. 252—182                                    3 Claims

ABSTRACT OF THE DISCLOSURE

Blends of (a) 85 to 50 percent by weight of the tetrol obtained by esterifying chlorendic acid (or anhydride) with substantially 2 molar proportions of trimethylolpropane and (b) 15 to 50 percent by weight of dipropylene glycol are liquids. They can be used as the sole polyol component in making fire retardant polyurethane foams which have comparable properties to those obtained from closely related, but solid (and therefore difficult to handle), chlorendic acid based resins.

BACKGROUND OF THE INVENTION

Field of the invention

This invention relates to polyols and to fire retardant polyurethanes prepared therefrom and is more particularly concerned with liquid forms of chlorendic acid based ester polyols and with fire retardant polyurethanes prepared therefrom.

Description of the prior art

The preparation of polyester polyols based on chlorendic acid, or the corresponding anhydride, is well-known in the art; see, for example, U.S. Pats. 2,865,869; 3,018,256; 3,058,925; 2,098,047; 3,156,659; and 3,214,392. Such polyester polyols are useful in the preparation of flame retardant polyurethanes, particularly in the preparation of cellular products, as is described in detail in the aforesaid U.S. patents. Unfortunately, said polyester polyols based on chlorendic acid or anhydride are invariably solid and require melting before blending with the various other components of a polyurethane reaction mixture. This represents a serious drawback in utilizing such polyols on the commercial scale of operations. Accordingly, such polyols are usually marketed as blends with other materials of such a nature that the overall composition is liquid and, therefore, readily handled. However, the use of such blends serves to reduce the excellent properties, in terms of flame retardancy, which can be achieved if the undiluted polyester polyol is employed as a component in the preparation of polyurethanes.

We have now found that a particular polyester polyol derived from chlorendic acid or anhydride can be converted to a liquid form by blending with a particular low molecular weight diol and that such blending does not in any way detract from the desirable properties which are conferred upon a polyurethane by use of the unblended polyester polyol alone. Such finding is unexpected in at least two ways. Firstly, it would be expected that introduction of a diol in such a blend would materially and adversely affect the properties of the resultant polyurethane prepared from the blend. In the particular blend which is the subject of this invention the introduction of the diol has no significant effect on the properties of the resultant polyurethane.

Secondly, we have found, surprisingly, that only one, out of a large number of known diols having closely similar physical and chemical properties, is useful in the compositions of this invention.

SUMMARY OF THE INVENTION

This invention relates to a polyol blend consisting of (a) from 85 to 50 percent by weight of the tetrol having the formula:

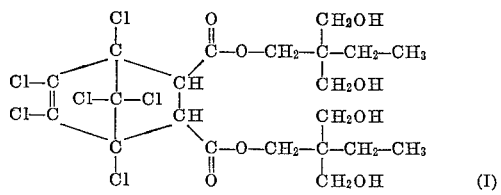

and (b) from 15 to 50 percent by weight of dipropylene glycol.

DETAILED DESCRIPTION OF THE INVENTION

The novel compositions of the invention are obtained by blending the polyester polyol of Formula I and dipropylene glycol in the appropriate proportions. The blending can be achieved in any convenient manner. For example, the solid polyester polyol (I) can be melted and then admixed with the dipropylene glycol which latter is a liquid at ordinary room temperatures (i.e., circa 25° C.). Alternatively, the two components can be admixed and the mixture heated wtih agitation until a homogeneous liquid is obtained.

The polyester polyol (I) is the diester obtained by esterification of 1,4,5,6,7,7 - hexachlorobicyclo[2.2.1]-5-heptene-2,3-dicarboxylic acid (or the corresponding anhydride or acid halide) with trimethylolpropane. Said acid is more commonly designated as "chlorendic acid" and will be so designated throughout this specification and claims. The esterification is conveniently carried out by reacting 1 molar proportion of chlorendic acid, or the corresponding anhydride or acid halide, with substantially 2 molar proportions of trimethylolpropane under conditions well-known in the art for the esterification of carboxylic acids with primary alcohols. For example, when chlorendic anhydride or acid halide is employed as reactant, it is convenient to add the required amount of chlorendic anhydride or acid halide, continuously or in portions, to molten trimethylolpropane the rate of addition being adjusted so that the exotherm generated by the reaction can be controlled without the necessity for drastic external cooling. When free chlorendic acid is employed as reactant it is usually necessary to employ a small amount, e.g., about 1 to 5 percent by weight, of an esterification catalyst such as hydrogen chloride, sulfuric acid, and the like, and to heat the reaction mixture under reflux until the theoretical quantity of water of condensation has been eliminated. Whichever esterification procedure is adopted, it is advantageous to carry out the process under an inert atmosphere, i.e., to exclude atmospheric oxygen from the reaction vessel by passing therethrough a continuous stream of an inert gas such as nitrogen, argon, krypton, and the like. The progress of the esterification is followed by measuring the acid number (i.e., the number of milligrams of potassium hydroxide equivalent to the acidity of 1 gram of polyol) of aliquots of the reaction mixture. The acid number of the final product should advantageously be less than 10 and preferably less than 5. The diester (I) so obtained generally needs no purification except for removal of any residual water of condensation by heating under reduced pressure, and, if an acid catalyst is used when chlorendic acid is employed as reactant, the neutralization of said catalyst by washing of the diester (I) with dilute alkali such as aqueous sodium carbonate solution.

The novel compositions of the invention are liquids at temperatures above about 15° C. and can be stored indefinitely with no sign of solidification provided the storage temperature does not fall below about 15° C. The viscosity at 25° C. of the compositions ranges from the order of 100,000 cps. for those containing the highest proportion (i.e. 85% by weight) of polyester polyol (I) to about 10,000 cps. for those containing the highest proportion of dipropylene glycol.

Those compositions of the invention in which the proportion of polyester polyol (I) is within the range of about 80 to about 70 percent by weight and the proporportion of dipropylene glycol is correspondingly within the range of about 20 to about 30 percent by weight, are particularly preferred. Such compositions have a viscosity at 25° C. within the range of about 70,000 cps. (for the highest proportion of (I) in the above range) to about 15,000 cps. (for the lowest proportion of (I) in the above range).

The compositions of the invention are particularly useful as polyol components in the preparation of polyurethanes, both cellular and noncellular. The use of the polyols of the invention in this manner confers flame retardant properties on the resulting polyurethanes, or enhances the inherent flame retardant properties thereof. Thus, the polyols of the invention can be used as the sole polyol component and can be used to replace part of the polyol conventionally employed in the preparation of polyurethanes. The methods of preparing polyurethanes, both cellular and noncellular, are well-known in the art and do not require detailed description herein. Such detailed description can be found, for example, in Saunders et al., Polyurethanes, Chemistry and Technology, Part II, Interscience, 1964.

It has been found, surprisingly and unexpectedly, that the properties of polyurethanes, particularly of rigid cellular polyurethanes, prepared from the compositions of the invention possess the same outstanding structural strength and fire retardant properties as those prepared from an equivalent amount of the polyester polyol (I) above. This result is indeed surprising since it is well-recognized in the art that the introduction of a diol into the polyol component employed to make a polyurethane, particularly a rigid cellular polyurethane, usually results in a deterioration of structural strength, due to a reduction in amount of cross-linking, in the polyurethane. Said result is even more surprising in view of the finding that diols which are closely related in physical and chemical properties to dipropylene glycol, do not give blends with the polyester polyol (I) having the same desirable properties as the compositions of the invention. For example, it has been found that diols such as 1,3-hexanediol, 1,3-propylene glycol, ethylene glycol and the like, and triols such as glycerol and the adducts thereof with ethylene oxide, propylene oxide, and the like, do not give comparable results when used to replace dipropylene glycol in the compositions of the invention.

Accordingly, this invention provides a unique blends of polyols which has the advantage of being liquid and, therefore, readily transported, metered, and mixed in polyurethane formulations, and additionally can be made to confer upon the resulting polyurethane the same desirable properties as those achieved using the polyester polyol (I) alone.

The following examples describe the manner and process of making and using the invention and set forth the best mode contemplated by the inventors of carrying out the invention but are not to be construed as limiting.

EXAMPLE 1

(a) The diester (I) of chlorendic acid and trimethyolpropane was prepared as follows:

A batch of 755 parts by weight (5.66 moles) of trimethylolpropane was heated to 100° C. with stirring and was maintained thereat for 1 hour under reduced pressure to remove water. The resulting dry material was maintained under nitrogen while a total of 1000 parts by weight (2.7 moles) of chlorendic anhydride (1,4,5,6,7,7-hexachlorobicyclo[2.2.1]-5-heptane-2,3-dicarboxylic acid anhydride; Velsicol Chemical Corporation) was added at such a rate that the temperature of the reaction mixture was maintained at approximately 100° C. throughout. When the addition was complete, the resulting mixture was heated to 180° C. to 190° C. as rapidly as possible and maintained within that temperature range, with removal of water via a water trap, until the acid number (determined by examination of aliquots at frequent intervals) had fallen below 10. When this point had been reached, the heating of the reaction mixture was continued under reduced pressure within the same temperature range until the acid number of the reaction mixture had fallen below 4.0. The resulting mixture was cast in trays and allowed to cool to give the diester of chlorendic acid and trimethylolpropane as a brittle solid having an equivalent weight of 147, an acid number of 3.4 and a melting point of 80° C. to 100° C.

(b) A mixture of 80 parts by weight of the above diester and 20 parts by weight of dipropylene glycol was heated gently with agitation until a clear homogeneous liquid was obtained. The resulting liquid was allowed to cool to room temperature (circa 20° C.) and was stored at ambient temperature (ranging from about 15° C. to about 25° C.). The product remained liquid and no solids were deposited therefrom even after storage for 10 months under these conditions.

EXAMPLE 2

A mixture of 75 parts by weight of the diester prepared as described in Example 1 (a), and 25 parts by weight of dipropylene glycol was heated gently with agitation until a clear homogeneous liquid was obtained. The resulting liquid was allowed to cool to room temperature (circa 20° C.) and was stored at ambient temperature (ranging from about 15° C. to about 25° C.). The product remained liquid and no solids were deposited therefrom even after storage for 10 months under these conditions.

Similarly, using the above mixing procedures, other storage stable compositions of the invention are prepared from the appropriate proportions of dipropylene glycol and the diester prepared as described in Example 1(a).

EXAMPLE 3

Rigid polyurethane foams were prepared in the following manner from each of the polyol blends prepared as described in Examples 1(b) and 2.

A mixture of 100 parts of the polyol blend, 2 parts by weight of organo silicone surfactant (SF–1109; Technical Data bulletin SF–1109 General Electric Corporation), 1.2 parts by weight of N,N,N',N',-tetramethyl-1,3-butanediamine, and 1.2 parts by weight of triethylamine, was prepared using a mechanical blender and 32 parts by weight (33 parts by weight in the case of the foam prepared from the polyol blend of Example 2) of modified trichloromonofluoromethane (Freon 11–B: Du Pont) was passed into the mixture. The resulting mixture was then mixed, using a high speed stirrer, with 122 parts by weight (128 parts by weight in the case of the formulation based on the polyol blend of Example 2) of polymethylene polyphenyl isocyanate (PAPI®; The Upjohn Company; equivalent weight 133) and poured, within 15 seconds of mixing, into open molds (7" x 7" x 11"). When foaming was completed, the resulting foams were cured for 3 days at circa 25° C. before being subjected to physical tests.

The results of the latter are summarized in the following table:

TABLE I

| Polyol blend used to prepare foam | Example 1(b) | Example 2 |
|---|---|---|
| Foam properties: | | |
| Density; p.c.f. | 2.10 | 2.06 |
| Compression; p.s.i. (Parallel to rise) | 47.9 | 33.0 |
| S/D | 22.8 | 16.0 |
| Percent Δ vol. at 158° F., 100% Relative humidity after— | | |
| 24 hours [1] | 2.4 | 2.4 |
| 3 days [1] | 3.1 | 3.1 |
| 7 days [1] | 3.4 | 3.5 |
| Percent Δ vol. at 200° F. Ambient Relative humidity [1] | 2.2 / 2.3 | 1.9 / 2.2 |
| Flame Test (ASTM D1692-59T): | | |
| Max. inches burned | 0.6 | 0.7 |
| Min. inches burned | 0.3 | 0.5 |
| Classification | ([2]) | ([2]) |
| Burn Through Time [3] (min.), (sec.) | (81), (29) | (66), (55) |

[1] Tests carried out in accordance with procedures defined in "Physical Test Procedures for Rigid Urethane Foams" published by Market Market Development Section, Atlas Chemical Industries, Inc. Wilmington, Delaware.
[2] Non-burning.
[3] Measured in accordance with D.W. Mitchell "Flame Penetration Test", Bureau of Mines RI 6366, U.S. Department of the Interior, 1964.

EXAMPLE 4

For purposes of comparison a series of polyol blends outside the scope of this invention was prepared using the procedure described in Example 1(b) but replacing the dipropylene glycol by an equal weight of 1,4-butanediol, 1,3-propanediol, 1,5-pentanediol, 1,2-propanediol, and ethylene glycol. From each blend so obtained there was prepared a rigid polyurethane foam using exactly the procedure and formulation described in Example 3 but adjusting the amount of polyisocyanate in each case so that the overall NCO/OH ratio was 1.10 to 1.00. In making the foams from the various blends it was observed that, in those blends in which the diol component was 1,4-butanediol, 1,2-propanediol, or ethyleneglycol, the polyol showed poor compatibility with the polyisocyanate. In the case of all blends except that in which 1,2-propane diol was present, the polyol component showed a limited solubility for the Freon 11-B. In the case of all blends the cells in the resulting foams were coarse. All the above observations were in marked contrast to the superior behavior of the corresponding polyol blend of the invention prepared as described in Example 1(b).

Further the burn-through time (measured in accordance with the procedure named in Example 3) of the various foams prepared from the above blends was markedly lower than the outstandingly high value observed for the foam prepared under exactly comparable conditions from the polyol blend described in Example 1(b). The following table sets forth the various burn-through times.

Diol component in polyol blend used
to prepare foam           Burn-through time
   1,4-butanediol                 27 min. 57 sec.
   1,3-propanediol                43 min. 02 sec.
   1,5-pentanediol                38 min. 30 sec.
   1,2-propanediol                43 min. 57 sec.
   Ethylene glycol                52 min. 50 sec.
   Dipropylene glycol [see Example 1(b)]                81 min. 29 sec.

We claim:
1. A polyol blend consisting of (a) from 85 to 50 percent by weight of the tetrol having the formula:

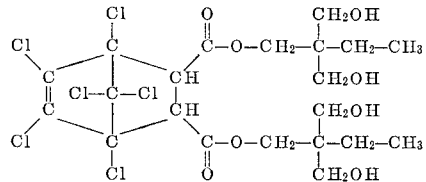

and (b) from 15 to 50 percent by weight of dipropylene glycol.

2. A polyol blend according to claim 1 containing 80 percent by weight of said tetrol and 20 percent by weight of dipropylene glycol.

3. A polyol blend according to claim 1 containing 75 percent by weight of said tetrol and 25 percent by weight of dipropylene glycol.

References Cited

UNITED STATES PATENTS 2,810,712   10/1957   Baranauckas.
2,950,265   8/1960   Caldwell et al.
3,278,580   10/1966   Worsley et al.

RICHARD D. LOVERING, Primary Examiner

I. GLUCK, Assistant Examiner

U.S. Cl. X.R.
260—2.5, 468